(12) United States Patent
Gane et al.

(10) Patent No.: US 8,916,121 B2
(45) Date of Patent: Dec. 23, 2014

(54) TREATMENT OF TALC IN A SOLVENT (75) Inventors: Patrick A. C. Gane, Rothrist (CH);
Daniel Gantenbein, Gempen (CH);
Joachim Schoelkopf, Killwangen (CH)

(73) Assignee: Mondo Minerals B.V., Amsterdam (NL)

( * ) Notice: Subject to any disclaimer, the term of this patent is extended or adjusted under 35 U.S.C. 154(b) by 418 days.

(21) Appl. No.: 12/598,918

(22) PCT Filed: May 27, 2008

(86) PCT No.: PCT/EP2008/056483
§ 371 (c)(1),
(2), (4) Date: Nov. 4, 2009

(87) PCT Pub. No.: WO2008/148666
PCT Pub. Date: Dec. 11, 2008

(65) Prior Publication Data
US 2010/0135886 A1    Jun. 3, 2010

(30) Foreign Application Priority Data

Jun. 8, 2007 (EP) .................................. 07109909

(51) Int. Cl.
*C01B 33/22* (2006.01)
*C01B 33/24* (2006.01)
*C09C 1/02* (2006.01)
*C01B 33/38* (2006.01)
*C09D 7/12* (2006.01)
*C08K 3/34* (2006.01)

(52) U.S. Cl.
CPC ............... *C09C 1/028* (2013.01); *C01B 33/38* (2013.01); *C09C 1/02* (2013.01); *C09D 7/1216* (2013.01); *C01P 2004/51* (2013.01); *C01P 2004/61* (2013.01); *C01P 2006/12* (2013.01); *C01P 2006/60* (2013.01); *C08K 3/34* (2013.01)
USPC ......... 423/331; 241/24.1; 241/24.11; 241/29; 241/30

(58) Field of Classification Search
USPC ................... 423/331; 241/24.1, 24.11, 29, 30
IPC ............................................. C01B 33/24,33/22
See application file for complete search history.

(56) References Cited

U.S. PATENT DOCUMENTS 3,684,197 A * 8/1972 Ashton et al. .................... 241/26
3,939,249 A * 2/1976 Huege ........................... 423/178
(Continued)

FOREIGN PATENT DOCUMENTS

JP    02055132    2/1990
JP    06329408    11/1994
(Continued)

OTHER PUBLICATIONS

Lehtinen (Industrial Minerals and Rocks), Dec. 1, 2001.*
(Continued)

*Primary Examiner* — Jun Li
(74) *Attorney, Agent, or Firm* — Benjamin C. Pelletier; Bret E. Field; Bozicevic, Field & Francis LLP (57) ABSTRACT

The present invention is directed to a process for the treatment of talc, comprising the steps of (a) providing a talc having a first brightness value B1, measured according to ISO 2469, and forming a suspension of the talc in a liquid phase, the liquid phase of the suspension comprising at least one organic solvent, (b) delaminating and/or reducing the weight median particle size $d_{50}$ of the talc, wherein the treated talc has a brightness value B2, measured according to ISO 2469, and $B2 \geq B1$.

20 Claims, 4 Drawing Sheets

(56) References Cited

U.S. PATENT DOCUMENTS

| | | | | |
|---|---|---|---|---|
| 4,391,734 A | * | 7/1983 | Ferreira et al. | 252/378 R |
| 4,814,019 A | * | 3/1989 | Weber | 106/469 |
| 4,852,811 A | * | 8/1989 | Adams et al. | 241/1 |
| 5,922,296 A | * | 7/1999 | Blasius | 423/279 |
| 6,022,911 A | * | 2/2000 | Hashizume et al. | 523/213 |
| 6,348,536 B1 | * | 2/2002 | Fourty et al. | 524/451 |
| 2002/0047058 A1 | * | 4/2002 | Verhoff et al. | 241/26 |
| 2006/0143938 A1 | * | 7/2006 | Karato et al. | 34/397 |

FOREIGN PATENT DOCUMENTS

| | | |
|---|---|---|
| WO | 0008106 | 2/2000 |
| WO | 2007024252 | 3/2007 |

OTHER PUBLICATIONS

Ciullo et al (Talc Shape and Form Meet Function, Paint and Coatings Industry Magazine, Jan. 2003, p. 1-6).*

Perez-Maqueda et al., "Preparation of submicron talc particles by sonication", Applied Clay Sciences, Elsevier Science NL; pp. 245-255, (2005), XP004688119.

Svehlova V et al., "Mechanical Properties of Talc-Filled Polypropylene Influence of Filler Content, Filler Particle Size, and Quality of Dispersion" Angewandte Makromolekulare Chemie, Applied Macromolecular Chemistry and Physics, Wiley VCH, Weinheim DE vol. 214 (1994) pp. 91-99; XP000425493.

* cited by examiner

TREATMENT OF TALC IN A SOLVENT

The present invention relates to a process of treating talc in a solvent.

Talc is a common magnesium silicate mineral having the chemical formula $Mg_3Si_4O_{10}(OH)_2$. It occurs as foliated masses having an extraordinary basal cleavage, the resulting folia being non-elastic, although slightly flexible. It is sectile and very soft, with a hardness of 1, thus being the softest on the Mohs' scale of mineral hardness.

Due to its hydrophobic character and very good adsorption properties regarding organic substances, talc is very useful in several industries, e.g. in ceramics production, as a lubricant or filler, e.g. in the plastics and paper industry, as a carrier in pharmaceutical or cosmetic preparations and many more.

The sandwich or leaf-like structure of talc plays an important role in most of these applications, which upon delamination provides a large active surface area. The thickness of one single "sandwich" of octahedral magnesium oxygen/hydroxyl layer between two tetrahedral silicon-oxygen layers is about 1 nm. Untreated individual talc particles usually contain several hundreds of such sandwiches. The size of such multi-sandwich particles can be over 100 μm, and determines the talc's lamellarity. A highly lamellar macrocrystalline talc has large individual platelets, whereas a microcrystalline compact talc's platelets are much smaller. By delamination of these sandwiches the active surface area of the talc consequently may be significantly enlarged.

The delamination of phyllosilicates such as talc is known for a long time, and is usually carried out by comminution, e.g. grinding.

In WO 98/45374 a process for treating a lamellar type mineral consisting of talc in the form of particles consisting of stacks of elementary leaves is described with a view to obtaining a functional filler in powder form for a polymeric material, which combines fine particle size distribution of the predefined type and a high lamellarity, the method comprising 5 steps: (a) suspending the mineral having an initial particle size with a median diameter $d_{50}$ greater than 5 microns in a liquid; (b) subjecting the suspension to a delamination operation by wet grinding so as to produce a separation of the leaves of the particles and so as to obtain a particle size less than the initial particle size; (c) then subjecting the suspension to a selection operation, so as to eliminate the particles with a size greater than a predetermined size; (d) drying the suspension; and (e) treating the mineral particles so as to limit the creation of strong irreversible bonds between them. Thus, not only a selection step is necessary according to WO 98/45374, which is carried out in a turbine selector (centrifuging of the suspension in a turbine provided with selection slits) or in a hydrocyclone (creation of a vortex for separation and selection) or in a centrifuge with an endless extraction screw (centrifuging of the suspension in a bowl and separation by extraction screw). In addition, further essential steps d) and e), i.e. drying the suspension and submitting the resulting powder to a special treatment are obligatory in the process of WO 98/45374 for obtaining the desired product. Consequently, the method described in this document requires a time-consuming procedure of 5 steps involving considerable, service intensive equipment, and rejects.

From U.S. Pat. No. 3,039,703, a method of reducing the size of particles is known, comprising forcing a liquid suspension of said particles under pressure against a bed of said particles in a cavity in the face of a valve. More particularly, this document describes an improved apparatus for reducing the particle size of lamellar minerals such as talc, and an improved valve used therein.

U.S. Pat. No. 3,307,790 describes a method of mineral froth flotation and a method, and an apparatus for simultaneously conditioning and selectively delaminating laminar mineral particles such as talc or mica in a pulp of such mineral particles in order to remove interlayer impurities from said laminar particles and expose fresh surfaces of the laminar mineral for contact with the flotation reagents and bubbles and thereby affect through froth flotation better separation of said laminar minerals from the pulp at a high purity.

U.S. Pat. No. 4,391,734 discloses a method for treating a phyllosilicate mineral wherein a suspension of phyllosilicate particles in an organic liquid having a dielectric constant of less than 35 is subjected to a grinding step.

WO 2007/024252 discloses a method for providing a dispersed nano-talc suspension, said method comprising dry-milling a talc powder, mixing the milled powder with an organic solvent and wet-milling the suspension.

For many applications, it is desired that the products to which the delaminated talc is added have beneficial optical properties such as high brightness. The physical property "brightness" is a measure of the reflectance of a material. Sheets having a low brightness appear yellow whereas those having high brightness appear white. For photo quality papers, brightness represents a key optical property which is important for print contrast. The higher the brightness, the higher is the contrast between the paper and printed image. Brightness is not only relevant for photo quality paper but also for papermaking in general as well as for paint and plastic material.

Thus, in addition to beneficial adsorption properties, delaminated talc, which is used as a filler for paper, plastics or paint, should have high brightness. Brightness can be increased by increasing the scattering coefficient of the material. The scattering coefficient is found to be dependent on the number of scattering centres present, the ratio of the particle diameter to the wavelength of the light, the ratio of the refractive indices of the particles and the surrounding medium, or the particle shape.

In general, brightness of talc is impaired by the presence of impurities. Thus, to improve brightness, the amount of impurities which are present in the talc should be reduced. However, additional process steps for removal of impurities have a detrimental impact on operating efficiency. Alternatively, talc from those deposits could be used which provide the mineral in high purity. However, restriction to talc from specific deposits impairs operation flexibility.

Furthermore, it has been realized that conventional prior art grinding processes for delamination of talc, in particular those using an aqueous grinding medium, normally result in a decrease of brightness. According to scattering theory, a potential strategy for compensating or even reversing the negative effect of delamination on brightness might be a reduction of median particle size. However, if talc of low purity is used, a reduction in particle size cannot compensate the decrease in brightness resulting from the delamination step. On the contrary, depending on the specific process conditions, even a further decrease in brightness might be observed.

Furthermore, if an additional process step is needed wherein the particle size is adjusted to a range compensating the drop in brightness due to the delamination step, operating efficiency is reduced.

Therefore, it is an object of the present invention to provide a simple, easy to operate treatment process of talc for increasing its specific surface area, said process being applicable to "low purity" talc (i.e. a non-purified talc still comprising significant amounts of those impurities having a detrimental impact on optical properties) but nevertheless at least maintaining or even improving brightness of the resultant talc.

The object outlined above is solved by a process for the treatment of talc, comprising the steps of:
(a) providing a talc having a first brightness value B1, measured according to ISO 2469, and forming a suspension of the talc in a liquid phase, the liquid phase of the suspension comprising at least one organic solvent,
(b) delaminating and/or reducing weight median particle size $d_{50}$ of the talc,
wherein the treated talc has a brightness value B2, measured according to ISO 2469, and B2≥B1.

Talcs which are useful in the present invention are any commercially available talcs covering a wide range of different origins.

Generally, talc deposits result from the transformation of existing rocks by hydrothermal fluids carrying one or several of the components needed to form the mineral (MgO, $SiO_2$, $CO_2$).

In the formation of talc deposits tectonics plays a major role. It enables hydrothermal fluids to penetrate the rock, creating micro-permeability that facilitates reactions. The shape and size of talc deposits depend on the intensity of the hydrothermal activity, which corresponds to the climate of a low to medium temperature metamorphism. Concurrent activity of pressure and deformation permit the transformation. The pressure and deformation ratios determine the crystallinity of the talc ore deposit.

Talc deposits differ according to the parent rock from which they are derived. Each ore has its own geological signature formed many millions of years ago. As a natural ore, talc is always found in combination with at least one other mineral, such as chlorite, dolomite and magnesite, amphibole, biotite, olivine, pyroxene, quartz and serpentine.

Four main deposit categories exist which differ in:
their mineralogical composition
their colour, which is measured in terms of whiteness or brightness
their crystalline structure, which is either platy or compact.

Accordingly, the following main groups of ores can be distinguished:
1. Magnesium carbonate ores: the talc evolves from the transformation of carbonates (dolomite and magnesite) in the presence of silica. The carbonates fix in-situ the magnesium, which is needed to form the mineral whereas the silica is provided by hydrothermal circulation. This reaction results in talc which is either mineralogical pure or associated with minerals such as carbonates, quartz and chlorite. Deposits in this vein provide the whitest and purest talc ores. Examples of this kind of deposits are Yellowstone (Montana USA), Respina (Spain), Three Springs (Australia) and Haicheng (China).
2. Serpentine derivate ores: the talc comes from the transformation of serpentine into a mixture of talc and magnesium carbonate. This ore is commonly called "soapstone". It is never pure and always grey. When using it as an industrial mineral, it is often upgraded by flotation to increase its talc content and whiteness. This type of deposit is relatively common and widely distributed along ultra-mafic rock belts. The term mafic is a shortening of the terms magnesium and iron. Ultra-mafic rocks are igneous rocks with silica content less than 45 wt.-%, generally more than 18 wt.-% magnesium oxide and high iron oxide content. Deposits belonging to this category are currently being mined in Vermont (USA), Quebec and Ontario (Canada) and Sotkamo (Finland).
3. Siliceous derivate ores: talc results from the transformation of siliceous rocks which provide the silica needed for the formation of the minerals. Chlorite can be formed in addition to the talc, the resulting ore is a mixture of both. This variant of deposit can be found in association with the magnesium carbonate derivate type for example in the French Pyrenees (France).
4. Magnesium sedimentary deposit derivate ores: although this form can be found in high concentrations, the talc ores are always found with impurities such as quartz, clay, organic materials and iron hydroxides.

For the present invention any of these four talc ore types and combinations thereof can be used. Preferred are magnesium carbonate ores (Australia and China) and serpentine derivate ores (Finland) or combinations thereof.

Also useful in the present invention may be talcs from Germany, Florence (Italy), Tyrol (Austria), Shetland (Scotland), Transvaal (South Africa), the Appalachians, California, and Texas (USA).

In a preferred embodiment, the talc provided in step (a) of the process of the present invention is selected from the group consisting of magnesium carbonate ores, serpentine derivative ores, siliceous ores, or mixtures thereof. Preferably, the talc provided in step (a) is talc from Sotkamo (Finland).

In a preferred embodiment, the talc provided in step (a) includes impurities selected from the group consisting of iron sulphide, carbon, or any mixture thereof.

Preferably, the talc provided in step (a) has a brightness of 80.0% or less, more preferably 78.0% or less, even more preferably 76.0% or less, and most preferably 74.0% or less, measured according to ISO 2469.

Preferably, the talc provided in step (a) has a purity of 99 wt % or less, more preferably 98 wt % or less, even more preferably 95 wt % or less. In preferred embodiments, the purity of the talc provided in step (a) is within the range of 50 to 99 wt %, more preferably 60 to 97 wt %, and even more preferably 90 to 96 wt %.

The composition and purity of the talcs useful in the present invention were analysed by X-ray fluorescence (XRF) (ARL 9400 Sequential XRF) and X-ray diffraction (XRD) (from 5-100° 2 theta Bragg diffraction using a Bruker AXS D8 Advanced XRD system with CuKα radiation, automated divergence slits and a linear position-sensitive detector. The tube current and voltage were 50 mA and 35 kV, respectively: the step size was 0.02° 2 theta and the counting time 0.5 s·$step^{-1}$).

Preferably, the talc particles provided in step (a) have a weight median particle size $d_{50}$ of up to 100 μm, e.g. 5 to 70 μm, preferably 10 to 60 μm, more preferably 15 to 40 μm, particularly 20 to 30 μm.

The $d_{50}$ particle size is the weight median value, which divides the mass distribution curve into two regions of equal volume or weight, so that 50% by volume or weight of the particle population have a diameter above the $d_{50}$ value, and 50% by volume or weight of the particle population have a diameter below the $d_{50}$ value. The particle size distribution providing the $d_{50}$ value can be determined by any method and equipment being suitable therefore. For the purposes of the present invention, it was determined by the Malvern method relating to volume %.

For the Malvern method, a MasterSizer S (3$$D Presentation (Fraunhofer)) can be used, which is a modular particle size analyser based on laser scattering particle size analysis. The Malvern Mastersizer S is configured to provide a dx value that represents the particle size at which x percent of the volume of the particles is smaller than this value. It can measure spray droplet size as well as wet and dry samples. This method also permits the determination of the particle size distribution of powder and suspension products, respectively, in the range of 0.05 to 900 μm by means of laser scattering and diffraction. For the purposes of the present invention the particle size distribution was carried out by means of laser light (He—Ne), wherein the measurement can be executed dry and/or wet, with two different automation equipments, the spectrum being covered by two optical lenses, lens 300 F for dry measurement of powder products in the range of 0.5 to 900 μm, and lens 300 RF for wet measurement of suspension and powder products in the range of 0.05 to 900 μm, respectively.

The specific surface area (SSA) of the starting talc provided in step (a) can be between 30 and 0.01 $m^2/g$, preferably between 18 $m^2/g$ and 1 $m^2/g$ more preferably between 12 $m^2/g$ and 2 $m^2/g$, especially between 2 and 5 $m^2/g$.

For the purposes of the present invention, the SSA is defined as the total surface area per unit of mass and is determined by the BET sorption method according to ISO 9277. The SSA can be measured with any equipment suitable for determining the SSA. For example, a TriStar 3000 Surface Area and Porosimetry Analyser (Micromeritics®) can be used, optionally with a sample preparation system such as the SmartPrep system, a fully automatic sample preparation and degas system (Micromeritics®).

Preferably, the talc content of the suspension is within the range of 5 to 25 wt %, more preferably 5 to 20 wt %, even more preferably 7 to 15 wt %, based on the total weight of the suspension.

Within the context of the present invention, the term "suspension" refers to a mixture of two substances, one of which is a liquid, the other a finely divided solid dispersed in the liquid. The suspended particles will settle over time if left undisturbed.

According to the present invention, the liquid phase of the suspension comprises at least one organic solvent.

Preferably, the organic solvent is selected from the group consisting of hydrocarbons, such as alkanes, e.g. $C_5$ to $C_{20}$ alkanes, preferably $C_5$ to $C_{16}$ alkanes, more preferably $C_5$ to $C_{12}$ alkanes, cycloalkanes such as cyclohexane, aromatic compounds such as benzene or alkyl substituted benzenes such as toluene, alcohols such as $C_1$ to $C_8$ alcohols, e.g. methanol, ethanol, propanol, butanol or hexanol, carbonic acid esters such as ethyl ethanoate, ethyl benzoate, methyl pentanoate, ethers such as diethylether, tert.-butylmethyl ether, dioxane, furane, carbonic acids such as acetic acid, propionic acid, formic acid, butyric acid, isopentyl acid, halogenated hydrocarbons such as dichloromethane, trichloromethane, tetrachloromethane, 1,1,2,2-Tetrachlorethane, chlorobenzene, bromomethane, iodomethane, dibromomethane, glycol derivatives, fats, wax, amides such as dimethylformamide, acetamide, amines such as triethylamine, aniline, aldehydes such as formaldehyde, acetaldehyde, ketones such as acetone, butanone, cyclohexanone, acetophenone, sulfoxides such as dimethylsulfoxide (DMSO), ionic liquids such as ethyl ammonium nitrate; or any mixture of the aforementioned organic solvents.

In a preferred embodiment, the organic solvent is hexane, octane, or a mixture thereof.

In another preferred embodiment, the organic solvent is benzine, boiling within the range of 100 to 140° C.

Preferably, the at least one organic solvent is present in an amount of at least 50 wt %, based on the weight of the liquid phase of the suspension. In further preferred embodiments, the organic solvent is present in an amount of at least 60 wt %, at least 70 wt %, at least 80 wt %, at least 90 wt %, or at least 95 wt %, based on the weight of the liquid phase of the suspension.

In a preferred embodiment, the liquid phase of the suspension is consisting of the organic solvent, no non-organic solvents such as water being present. Preferably, the liquid phase is consisting of an alkane, e.g. a $C_5$ to $C_{20}$ alkane, preferably a $C_5$ to $C_{16}$ alkane, more preferably a $C_5$ to $C_{12}$ alkane, a cycloalkane such as cyclohexane, an aromatic compound such as benzene or an alkyl substituted benzene such as toluene, or an alcohol such as $C_1$ to $C_8$ alcohols, e.g. methanol, ethanol, propanol, butanol or hexanol, carbonic acid esters such as ethyl ethanoate, ethyl benzoate, methyl pentanoate, ethers such as diethylether, tert.-butylmethyl ether, dioxane, furane, carbonic acids such as acetic acid, propionic acid, formic acid, butyric acid, isopentyl acid, halogenated hydrocarbons such as dichloromethane, trichloromethane, tetrachloromethane, 1,1,2,2-Tetrachlorethane, chlorobenzene, bromomethane, iodomethane, dibromomethane, glycol derivatives, fats, wax, amides such as dimethylformamide, acetamide, amines such as triethylamine, aniline, aldehydes such as formaldehyde, acetaldehyde, ketones such as acetone, butanone, cyclohexanone, acetophenone, sulfoxides such as dimethylsulfoxide (DMSO), ionic liquids such as ethyl ammonium nitrate; or any mixture of the aforementioned organic solvents. In a preferred embodiment, the liquid phase consists of hexane, octane, or benzine boiling within the range of 100° C. to 140° C., or any mixture thereof.

However, it is also possible that the liquid phase of the suspension comprises water in addition to the at least one organic solvent. Preferably, the water content is less than 50 wt %, more preferably less than 25 wt %, even more preferably less than 10 wt %, based on the weight of the liquid phase.

If water is present, it preferably forms an emulsion with the organic solvent.

The suspension may further comprise additives such as dispersants and fluidisers. Fluidisers make a system more liquid, i.e. lower the viscosity. Dispersants may have the same function, but also act to stabilize against agglomeration and/or preventing settling, which is no prerequisite for a fluidiser.

In step (b) of the process of the present invention, the talc is delaminated and/or its median particle size $d_{50}$ is reduced.

Any conventional grinding process which is known to effect delamination, possibly in combination with a reduction of median particle size, of layered silicates, in particular talc, can be used. Progression of delamination can be monitored via the increase of specific surface area. However, progression of delamination can be monitored by other analytical tools as well, e.g. {00l} relative peak intensity in X-ray diffraction measurements as a function of grinding time.

Preferably, conditions for delamination are such that the organic solvent is kept in a liquid state. If too much heat is evolved during the grinding step, the organic solvent can be cooled.

The delaminating step is preferably a wet grinding step, wherein advantageously a mill selected from the group comprising conventional horizontal and vertical ball mills, pearl mills, attritor mills, planetary mills and rod mills is used. Generally, all mills can be used, which are capable of delaminating talc particles.

The grinding media are preferably selected from the group comprising grinding balls, pellets and quartz sand.

If grinding balls are used, they are preferably made of a materials such as glass, cerium and/or yttrium stabilised zirconium dioxide, zirconium dioxide and zirconium silicate. Also, plastic balls can be useful in the present invention, such as balls made of polyoxymethylene (POM) or polystyrene (PS), as well as pellets, e.g. made of iron (Cyplex). It is also possible to use blends of the afore-mentioned grinding media.

In a preferred embodiment, the grinding balls have a diameter of 0.1 to 5 mm, preferably 0.2 to 3 mm, more preferably 0.5 to 2 mm, especially 1.0 to 1.6 mm, for example 1 mm.

The degree of delamination and, consequently, the increase of specific surface area can be adjusted by the running time of the grinding step (b). Preferably, the running time of step (b) is at least 30 minutes. In other preferred embodiments, the running time of step (b) is at least 60 minutes, at least 120 minutes, at least 180 minutes, at least 240 minutes, at least 300 minutes, or at least 360 minutes.

In a preferred embodiment, the talc provided in step (a) is treated in a homogeniser to effect a reduction in weight median particle size $d_{50}$, possibly in combination with an increase in specific surface area by delamination.

Any commercially available homogenisers, especially high pressure homogenisers, can be used wherein the suspension is pressed under high pressure through a restricted opening, which may comprise a valve, and is discharged from the restricted opening at high pressure against a hard impact surface directly in front of the restricted opening, thus reducing the particle size. The pressure may be generated by a pump such as a piston pump, and the impact surface may comprise an impact ring extending around the annular valve opening. One example for homogenisers which can be used in the present invention is Ariete NS2006L of NIRO SOAVI. However, inter alia, also homogenisers such as of the APV Gaulin Series, HST HL Series or the Alfa Laval SHL Series can be used.

For obtaining broken down material with reduced particle size, a pressure of above 100 bar, e.g. from 500 to 2000 bar, preferably from 600 to 1500 bar, more preferably from 700 to 1000 bar, particularly from 750 to 900 bar, e.g. 800 bar, can be used in the homogeniser.

According to the present invention, step (b) might comprise either a grinding treatment of the talc, e.g. in a ball mill, or a homogeniser treatment. However, it is also possible that step (b) comprises both treatments, i.e. grinding in combination with a homogeniser treatment. The choice depends on the technical effect to be favoured. If the main interest is to increase specific surface area, step (b) preferably comprises an extended grinding treatment but only a short-time homogeniser treatment. More preferably, step (b) only comprises grinding, e.g. in a ball mill, but no homogeniser treatment.

According to the process of the present invention, the treated (i.e. delaminated and/or reduced in particle size) talc has a brightness value B2, measured according to ISO 2469, said value B2 being as high as the brightness value B1 of the talc provided in step (a) or even higher, i.e. B2≥B1. Preferably, B2 is higher than B1.

The use of an appropriate organic solvent enables delamination (i.e. increase of surface area) and/or reduction in median particle size of a talc of lower purity while simultaneously avoiding a decrease in brightness of the resultant talc. Thus, as already discussed above, it is preferred that a talc still having a significant amount of impurities (or, in other words, having a lower brightness) be subjected to the process of the present invention. The amount of impurities and the brightness value B1 of the starting talc still resulting in maintenance or even improvement of brightness can vary. However, appropriate values can be easily established for the starting talc by monitoring the brightness values as a function of grinding time.

In preferred embodiments, the weight median particle size $d_{50}$ is reduced by at least 15%, at least 25%, at least 30%, at least 40%, or at least 50%, and/or the specific surface area is increased by at least 100%, at least 200%, at least 300%, at least 400%, or at least 500%.

In the process of the present invention, it might also be preferred to keep the reduction in median particle size within a certain range. In preferred embodiments, the median particle size reduction is within the range of 15 to 60%, 25 to 55%, or to 52%.

Preferably, the difference between the brightness B2 of the talc, which has been delaminated and/or reduced in median particle size, and the brightness B1 of the talc provided in step (a), expressed as (B2−B1), is at least 0.3%, more preferably at least 0.5%, even more preferably at least 0.7%.

In a preferred embodiment, the process according to the present invention further comprises a step (c) wherein the talc content of the suspension is increased by removal of the liquid phase.

Preferably, the liquid phase is removed until dryness of the treated talc. Within the context of the present invention, "dryness" preferably means less than 5 wt % of liquid phase, based on the weight of the talc. In further preferred embodiments, "dryness" means less than 3 wt %, less than 2 wt %, less than 1 wt %, less than 0.5 wt %, or even less than 0.1 wt % of liquid phase, based on the weight of the talc.

Furthermore, in a preferred embodiment a flotation step is carried out prior to step (b).

Step (c) may comprise thermal treatment, filtration, centrifugation, evaporation at reduced pressure, or any combination thereof.

According to a further aspect, the present invention provides the use of an organic solvent for increasing specific surface area, measured by the BET method according to ISO 9277 using nitrogen, of a talc while at least maintaining or increasing brightness, measured according to ISO 2469, of the talc.

With respect to the further characterization of the organic solvent, reference can be made to the statements provided above when discussing the process of the present invention.

With respect to the further characterization of the talc, reference can be made to the statements provided above when discussing the process of the present invention.

The invention will now be described in further detail by making reference to the following examples.

BRIEF DESCRIPTION OF THE DRAWINGS

FIG. 1.

FIG. 2.

FIG. 3.

FIG. 4.

EXAMPLES

Measuring methods

Brightness

The brightness is measured in terms of the ISO brightness R 457 (ISO 2469) with a Datacolor ELREPHO 3300 spectrophotometer using barium sulphate as a brightness standard (according to DIN 5033).

Purity of Talc

The composition and purity of the talc were analysed by X-ray fluorescence (XRF) (ARL 9400 Sequential XRF) and X-ray diffraction (XRD) (from 5-100° 2 theta Bragg diffraction using a Bruker AXS D8 Advanced XRD system with CuKα radiation, automated divergence slits and a linear position-sensitive detector. The tube current and voltage were 50 mA and 35 kV, respectively: the step size was 0.02° 2 theta and the counting time 0.5 s·step$^{-1}$).

Specific Surface Area

Specific surface area was determined by the BET sorption method according to ISO 9277. A TriStar 3000 Surface Area and Porosimetry Analyser (Micromeritics®) was used, optionally with a sample preparation system such as the SmartPrep system, a fully automatic sample preparation and degas system (Micromeritics®).

Median Particle Size d50

The $d_{50}$ value was determined according to the Malvern method. For the Malvern method, a MasterSizer S (3$$D (Fraunhofer)) was used, which is a modular particle size analyser based on laser scattering and diffraction particle size analysis. The Malvern Mastersizer S is configured to provide a dx value that represents the particle size at which x percent of the volume of the particles is smaller than this value. It can measure spray droplet size as well as wet and dry samples. This method also permits the determination of the particle size distribution of powder and suspension products, respectively, in the range of 0.05 to 900 μm by means of laser scattering and diffraction. For the purposes of the present invention the particle size distribution was carried out by means of laser light (He—Ne), wherein the measurement can be executed dry and/or wet, with two different automation equipments, the spectrum being covered by two optical lenses, lens 300 F for dry measurement of powder products in the range of 0.5 to 900 μm, and lens 300 RF for wet measurement of suspension and powder products in the range of 0.05 to 900 μm, respectively.

Example 1 and Comparative Example 1

In the following examples, a talc from Sotkamo, Finland, was subjected to a grinding process at room temperature in a sulfonation flask equipped with a stirrer and a condenser. Glass balls having a diameter of 1.2-1.4 mm were used as grinding media.

The starting talc had a weight median particle size $d_{50}$, measured by the Malvern method as described above, of 28.26 μm, a brightness of 73.40% (measured according to ISO 2469), and a specific surface area of 2.73 m$^2$/g (measured according to the BET method).

In Example 1, 100 g of the starting talc were suspended in 900 g benzine having a boiling point in the range of 100 to 140° C. The suspension was ground at room temperature for 6 h.

In Comp. Example 1, 100 g of the starting talc were suspended in 900 g water. The suspension was ground at room temperature for 6 h.

The particle size distribution was measured at the beginning and at the end of each trial. Furthermore, specific surface area as well as brightness were measured.

The results are shown in Tables 1 to 4 and FIGS. 1 to 4.

TABLE 1

$d_{50}$ development by Malvern MasterSizer

| | Starting Talc | Talc after grinding in water for 6 h | Talc after grinding in benzine for 6 h |
|---|---|---|---|
| $d_{50}$/μm | 28.26 | 18.91 | 13.86 |

TABLE 2

Brightness R457 development

| | Starting Talc | Talc after grinding in water for 6 h | Talc after grinding in benzine for 6 h |
|---|---|---|---|
| Brightness % | 73.40 | 70.40 | 74.20 |

TABLE 3

Specific surface area (BET) development

| | Starting Talc | Talc after grinding in water for 6 h | Talc after grinding in benzine for 6 h |
|---|---|---|---|
| Specific surface area m$^2$/g | 2.73 | 17.27 | 14.26 |

TABLE 4

Particle size distribution by Malvern MasterSizer.

| Malvern MasterSizer S Particle size/μm | Starting talc Cumulative Volume % | Talc after grinding in water for 6 h Cumulative Volume % | Talc after grinding in benzine for 6 h Cumulative Volume % |
|---|---|---|---|
| 0.600 | 0.02 | 0.00 | 0.02 |
| 0.700 | 0.12 | 0.02 | 0.12 |
| 0.800 | 0.22 | 0.09 | 0.23 |
| 0.900 | 0.34 | 0.15 | 0.34 |
| 1.000 | 0.46 | 0.21 | 0.45 |

TABLE 4-continued

Particle size distribution by Malvern MasterSizer.

| Malvern MasterSizer S Particle size/μm | Starting talc Cumulative Volume % | Talc after grinding in water for 6 h Cumulative Volume % | Talc after grinding in benzine for 6 h Cumulative Volume % |
|---|---|---|---|
| 1.500 | 1.17 | 0.57 | 1.11 |
| 2.000 | 2.05 | 1.03 | 2.00 |
| 3.000 | 4.16 | 2.34 | 4.62 |
| 4.000 | 6.49 | 4.16 | 8.23 |
| 5.000 | 8.89 | 6.45 | 12.49 |
| 6.000 | 11.30 | 9.15 | 17.09 |
| 8.000 | 15.95 | 15.38 | 26.48 |
| 9.000 | 18.17 | 18.75 | 31.02 |
| 10.000 | 20.30 | 22.18 | 35.37 |
| 12.000 | 24.36 | 29.03 | 43.39 |
| 15.000 | 29.96 | 38.80 | 53.64 |
| 20.000 | 38.27 | 52.77 | 66.53 |
| 25.000 | 45.62 | 63.72 | 75.51 |
| 32.000 | 54.66 | 74.87 | 83.82 |
| 36.000 | 59.25 | 79.56 | 87.09 |
| 40.000 | 63.46 | 83.34 | 89.64 |
| 45.000 | 68.21 | 87.06 | 92.07 |
| 50.000 | 72.45 | 89.92 | 93.90 |
| 56.000 | 76.90 | 92.51 | 95.52 |
| 63.000 | 81.30 | 94.71 | 96.87 |
| 71.000 | 85.44 | 96.46 | 97.92 |
| 80.000 | 89.12 | 97.78 | 98.71 |
| 90.000 | 92.24 | 98.73 | 99.26 |
| 100.000 | 94.56 | 99.32 | 99.61 |
| 112.000 | 96.54 | 99.73 | 99.85 |
| 125.000 | 97.97 | 99.97 | 99.97 |
| 140.000 | 98.97 | 100.00 | 100.00 |
| 160.000 | 99.67 | 100.00 | 100.00 |
| 180.000 | 99.93 | 100.00 | 100.00 |
| 200.000 | 99.99 | 100.00 | 100.00 |
| 224.000 | 100.00 | 100.00 | 100.00 |

The Malvern MasterSizer measurement (see FIG. 1) shows that benzine as a grinding solvent achieves finer particles than when using water. The $d_{50}$ value of in-benzine treated talc was 13.9 μm and the $d_{50}$ value of water treated talc was 18.9 μm (see FIG. 2).

Figure 1:
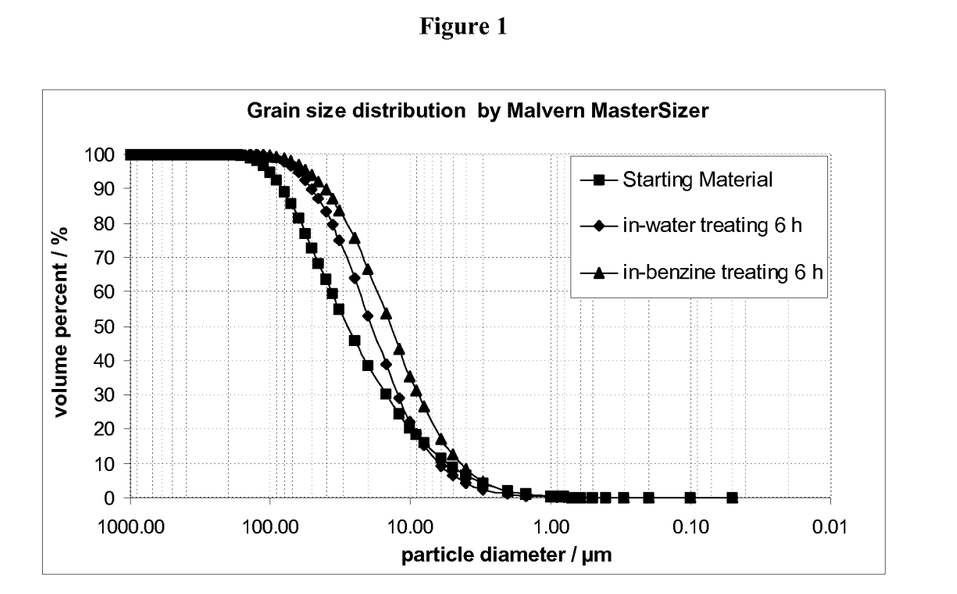
FIG. 1 is a graph of grain size distribution that shows volume percent (%) as a function of particle diameter (μm). The graph provides volume percent data for a starting talc material, a talc material that was treated in water for 6 hours, and a talc material that was treated in benzine for 6 hours.
Figure 2:
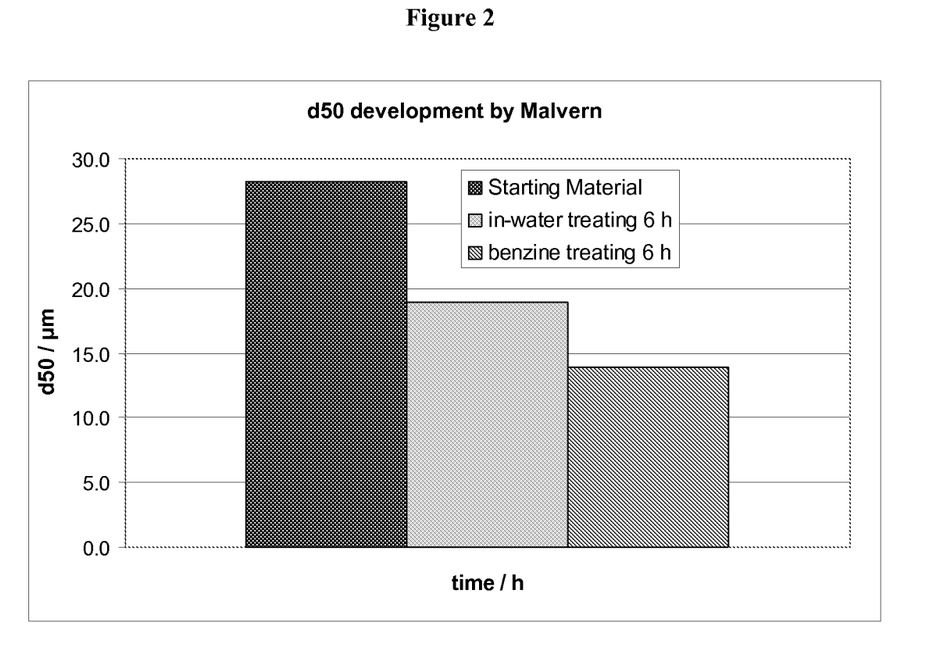
FIG. 2 is a graph of median diameter ($d_{50}$) development that shows $d_{50}$ (μm) as a function of time (hours). The graph provides $d_{50}$ data for a starting talc material, a talc material that was treated in water for 6 hours, and a talc material that was treated in benzine for 6 hours.
Figure 3:
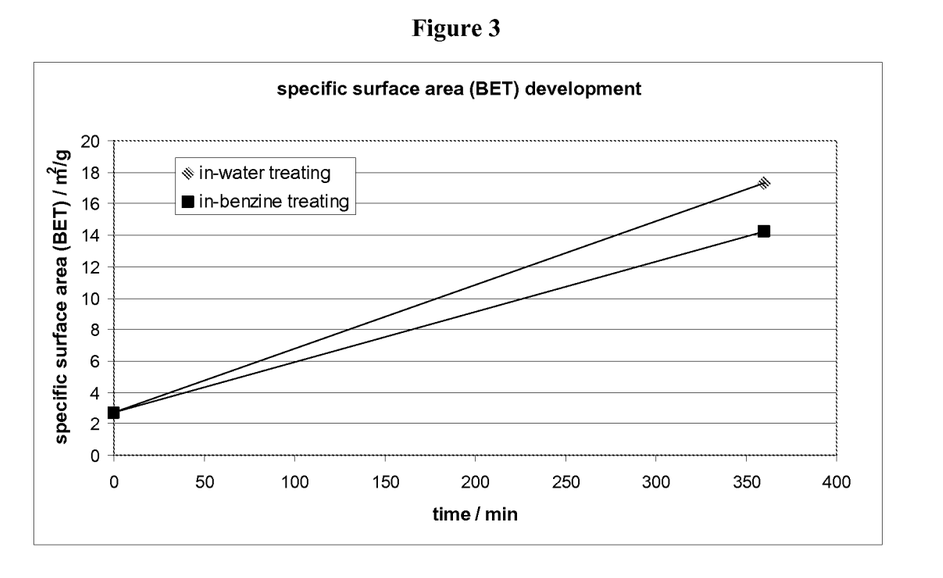
FIG. 3 is a graph of specific surface area (BET) development that shows specific surface area (BET) ($m^2/g$) as a function of time (minutes). The graph provides specific surface area (BET) data for a talc material that was treated in water, and for a talc material that was treated in benzine.
Figure 4:
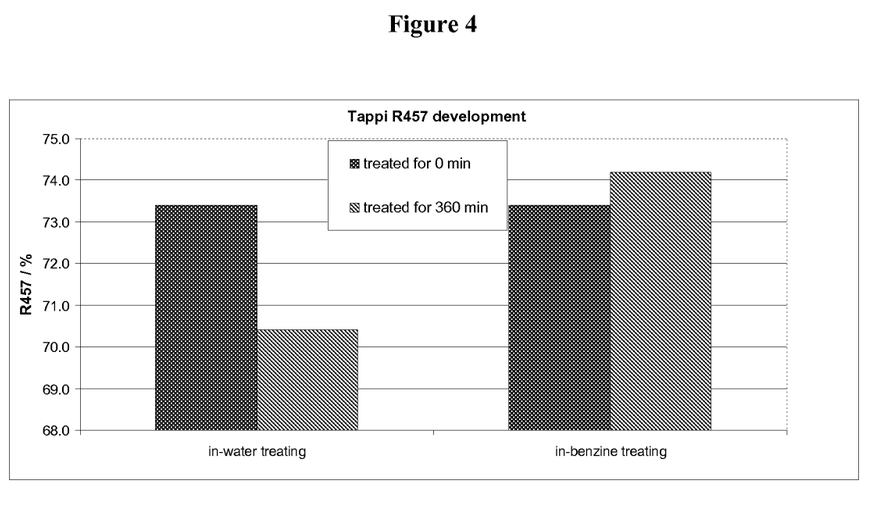
FIG. 4 is a graph of brightness R457 development that shows brightness R457 (%) for two different treatments. The graph provides brightness data for a talc material that was treated in water for 0 minutes and for 360 minutes, as well as for a talc material that was treated in benzine for 0 minutes and for 360 minutes.

The specific surface area of in-water treated talc achieved a value of 17.3 m$^2$/g and the specific surface area of in-benzine treated talc was 14.3 m$^2$/g after 6 h treating time (see FIG. 3).

The brightness R457 value of in-water treated talc achieved a value of 70.4% whereas the in-benzine treated talc achieved a value of 74.2% after 6 h treating time which is higher than the brightness value of the starting talc.

The invention claimed is:

1. A process for the treatment of talc, the process comprising the steps of:
   (a) forming a suspension of a talc in a liquid phase, the liquid phase of the suspension comprising hexane, octane, or a mixture thereof, wherein the talc:
      (i) has a purity of 98 wt % or less and a specific surface area ranging from about 2 to about 12 m$^2$/g, measured by the BET method according to ISO 9277 using nitrogen;
      (ii) has an initial weight median particle size ($d_{50}$), measured by laser diffraction/scattering particle size analysis according to the Malvern method, ranging from about 15 to about 40 μm;
      (iii) has a first brightness value B1 of 80% or less, measured according to ISO 2469; and
      (iv) includes impurities selected from the group consisting of iron sulphide, carbon, or any mixture thereof, and
   (b) increasing the specific surface area of the talc by about 100% to about 500% relative to the specific surface area of the talc provided in step (a) in the liquid phase to produce a treated talc, and decreasing the $d_{50}$ of the talc into the range of about 7 to about 30 μm, wherein the treated talc has a brightness value B2, measured according to ISO 2469, and B2 is greater than B1 by at least 0.3%.

2. The process according to claim 1, wherein the talc provided in step (a) is talc from Sotkamo (Finland).

3. The process according to claim 1, wherein the talc content of the suspension is within the range of 5 to 25 wt %, based on the total weight of the suspension.

4. The process according to claim 1, wherein the at least one organic solvent is present in an amount of at least 50 wt %, based on the weight of the liquid phase of the suspension.

5. The process according to claim 4, wherein the liquid phase of the suspension consists of the organic solvent.

6. The process according claim 1, wherein the liquid phase of the suspension further comprises water.

7. The process according to claim 6, wherein the water and the organic solvent form an emulsion.

8. The process according to claim 1, wherein step (b) comprises grinding of the talc suspension.

9. The process according to claim 8, wherein the talc suspension is ground in a ball mill.

10. The process according to claim 1, wherein step (b) comprises treatment of the talc suspension in a homogeniser.

11. The process according to claim 10, wherein the homogeniser is a high pressure homogeniser.

12. The process according to claim 1, further comprising a step (c) wherein the talc content of the suspension is increased by removal of the liquid phase.

13. The process according to claim 12, wherein the liquid phase is removed until dryness of the treated talc.

14. The process according to claim 12, wherein step (c) comprises thermal treatment, filtration, centrifugation, evaporation at reduced pressure, or any combination thereof.

15. The process according to claim 1, wherein the difference between the brightness B2 of the treated talc and the brightness B1 of the talc provided in step (a), expressed as (B2−B1), is at least 0.5%.

16. The process according to claim 1, wherein step (b) is carried out for at least 1 hour.

17. The process according to claim 1, wherein the talc comprises particles that are larger than 100 μm.

18. The process according to claim 1, wherein the talc comprises macrocrystalline talc particles.

19. The process according to claim 1, wherein the talc comprises microcrystalline compact talc particles.

20. The process according to claim 1, wherein the initial weight median particle size $d_{50}$ of the talc ranges from about 20 μm to about 30 μm, and is decreased to a size ranging from greater than 9 μm up to 23 μm.

\* \* \* \* \*